United States Patent
Sacchettini

(10) Patent No.: US 9,527,651 B2
(45) Date of Patent: Dec. 27, 2016

(54) INSULATED CONTAINER

(75) Inventor: Carlo Sacchettini, Nantes (FR)

(73) Assignee: CARLO SACHETTINI IMPORTS (C.S.I), Nantes (FR)

( * ) Notice: Subject to any disclaimer, the term of this patent is extended or adjusted under 35 U.S.C. 154(b) by 763 days.

(21) Appl. No.: 13/700,360

(22) PCT Filed: May 24, 2011

(86) PCT No.: PCT/EP2011/058501
§ 371 (c)(1),
(2), (4) Date: Feb. 15, 2013

(87) PCT Pub. No.: WO2011/147847
PCT Pub. Date: Dec. 1, 2011

(65) Prior Publication Data
US 2013/0136880 A1    May 30, 2013

(30) Foreign Application Priority Data

May 27, 2010    (FR) .................................. 10 02238

(51) Int. Cl.
  *B65D 81/38* (2006.01)
  *B32B 1/00* (2006.01)
  *B32B 5/26* (2006.01)

(52) U.S. Cl.
  CPC .............. *B65D 81/38* (2013.01); *B32B 1/00* (2013.01); *B32B 5/26* (2013.01); *B65D 81/3897* (2013.01); *Y10T 428/1362* (2015.01)

(58) Field of Classification Search
  CPC ............ Y10T 442/3472; Y10T 442/3512; Y10T 442/3528; Y10T 442/3602; Y10T 428/1362; B65D 81/38; B65D 81/3897; B32B 1/00; B32B 5/26

USPC ................. 442/244, 246, 255, 264
See application file for complete search history.

(56) References Cited

U.S. PATENT DOCUMENTS

| | | | | |
|---|---|---|---|---|
| 1,903,960 | A * | 4/1933 | Dreyfus | 442/244 |
| 4,211,267 | A * | 7/1980 | Skovgaard | 383/101 |
| 5,204,172 | A * | 4/1993 | Gidley | 442/232 |
| 2004/0013830 | A1* | 1/2004 | Nonomura et al. | 428/34.2 |
| 2007/0274613 | A1* | 11/2007 | Pruchnicki et al. | 383/110 |
| 2009/0176428 | A1* | 7/2009 | Tatsuno | 442/239 |

FOREIGN PATENT DOCUMENTS

| | | |
|---|---|---|
| EP | 1291283 | 3/2003 |
| FR | 2219002 | 9/1974 |
| WO | WO 2010/049927 | 5/2010 |

OTHER PUBLICATIONS

Natural Fibers, "Jute—International Year of Natural Fibers," 2009 available at http://www.naturalfibres2009.org/en/fibres/jute.html.*

* cited by examiner

*Primary Examiner* — Jeremy R Pierce
(74) *Attorney, Agent, or Firm* — Hamre, Schumann, Mueller & Larson, P.C.

(57) ABSTRACT

This invention relates to an insulated container (1) comprising at least one wall (7) comprising at least one layer of a first material including jute, at least one layer of a second material including a natural fiber and at least one layer of a third material including a natural fiber, the layer of the first material being trapped between at least one layer of the second material and at least one layer of the third material, the first, second and third materials being made of woven cloth.

6 Claims, 2 Drawing Sheets

INSULATED CONTAINER

FIELD OF THE INVENTION

Figure 1:
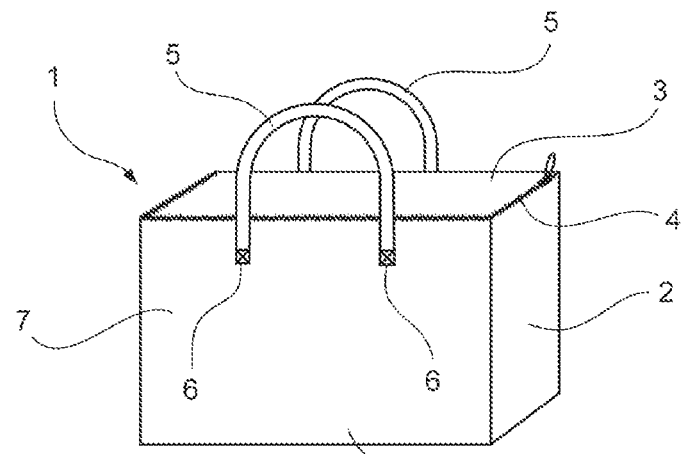

The invention relates to the field of containers, in particular that of insulated containers, having a thermal efficiency, sometimes referred to as isothermal; this type of container is arranged in order to store a content, for example a refrigerated or frozen or deep frozen food product or to be ingested, arranged inside the container at a low temperature as long as possible, despite a higher exterior temperature.

SOLUTIONS OF PRIOR ART

A large number of insulated containers made of flexible material sometimes referred to as coolers are known comprising plastic or synthetic materials to store food items at a low temperature, with the food items being refrigerated or frozen or deep frozen.

A disadvantage of these containers is that in general they are not sufficiently environmentally-friendly.

Another disadvantage of this type of containers is that they do not generally have a long lifespan, as they are often not solid enough.

Moreover, containers are known made of natural fibres such as cotton, that are environmentally-friendly, but of which the isothermal or insulating power is insufficient to contain at ambient temperature, which is sometimes high, one or more refrigerated, frozen or deep frozen food products by maintaining it in this state for a duration deemed as satisfactory, in particular in order to allow for the transport of the product or products without breaking the cold chain.

OBJECTIVES OF THE INVENTION

The invention therefore in particular has for object to overcome all or a portion of these disadvantages of prior art.

More precisely, the invention has for object to provide a solid container, having thermal efficiency, in particular an isothermal or insulating power that is sufficient and which however is still environmentally-friendly.

The invention has in particular for object to provide an insulated container allowing for the transport of one or several refrigerated, frozen or deep frozen food products or to be ingested without breaking the cold chain during a sufficient duration, for example between 30 min and 1 h 30.

DESCRIPTION OF THE INVENTION

The invention achieves this thanks to an insulated container comprising at least one wall comprising at least one layer of a first material including jute and at least one layer of a second material including a natural fibre.

Thanks to the invention, the container has satisfactory thermal efficiency while still using materials with a natural fibre base, that are environmentally-friendly.

Indeed, the first material includes jute which is a natural fibre and the second material also includes a natural fibre.

Also thanks to the invention, a consumer can transport in the insulated container according to the invention one or several refrigerated, frozen or deep frozen food products or to be ingested, without breaking the cold chain during a sufficient duration, for example between approximately 30 min and 1 h 30.

The container according to the invention can be adapted to be washed, for example in a washing machine. The container according to the invention can be arranged to be reused. The container according to the invention can comprise at least one flexible wall, i.e. not rigid.

The wall can further comprise at least one layer of a third material including a natural fibre.

In this case, the layer of the first material can be trapped between at least one layer of the second material and at least one layer of the third material.

The second and third materials can include the same natural fibre, in particular with a similar or different density.

For example, an exterior layer of the container can include a material with a density that is higher than an interior layer of the container, which as such comprises a density that is not as high for example.

The second material and/or the third material can include a natural fibre selected from the group consisting of: cotton, silk, flax, hemp and wool.

The first material can consist of jute canvas.

The first, second and third materials can be made of woven cloth or, alternatively, of non-woven cloth. One of the materials can consist of a woven cloth and the two others of a non-woven cloth or one of the materials can consist of a non-woven cloth and the two other materials can consist of non-woven cloths or all of the materials can be carried out in woven cloth or all of the materials can be carried out in non-woven cloth.

At least one of the layers, in particular an exterior layer of the container, can be coated with a layer of a polymer, in particular with a layer of polyethylene, which can for example be glued onto the exterior layer.

At least one layer, for example the exterior layer, can be laminated before a possible gluing of a layer of polymer forming a coating of the container.

The presence of a layer of polymer forming a coating of the container can make it possible to waterproof the container and to provide it with a certain degree of rigidity.

The first material can be arranged in a single layer, with a density that can be substantially equal to 250 g/m2. Alternatively, the first layer can be arranged in several layers, for example in two layers, each layer able to have a density less than 250 g/m2, for example a density equal to approximately 125 g/m2.

The container can include for example an interior layer of the second material comprising cotton with a density substantially equal to 110 g/m2, two central layers of the first material including jute each being of a density substantially equal to 125 g/m2 and an exterior layer of the third material comprising cotton with a density substantially equal to 240 g/m2, in particular at nearly 5% approximately.

The container according to the invention can include a closing member, such as a zip closure and/or Velcro closure.

The container according to the invention can include means for grasping and/or carrying, such as a handle.

The container can be selected from the group comprised of: an insulated bag, a bottle holder, and any packaging or container used to maintain the cold chain during a well-determined period, for example a period between approximately 30 min and 1 h 30.

The container can be carried out in a way as to be flexible, for example in order to be folded.

LIST OF FIGURES

Figure 2:
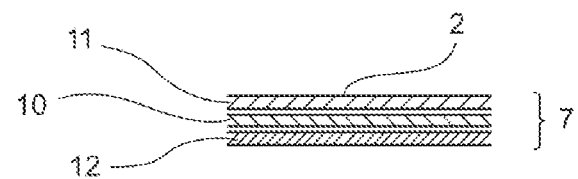
Figure 3:
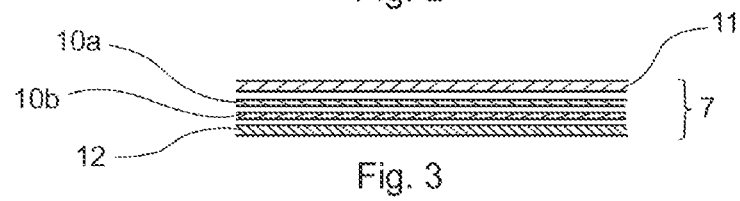
Figure 6:
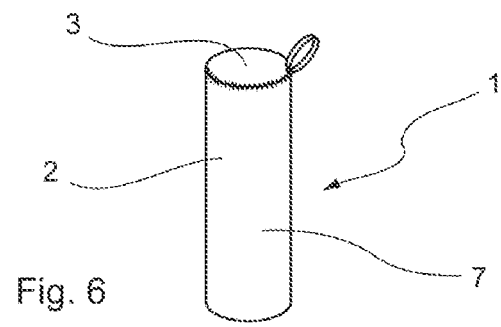
Figure 4:
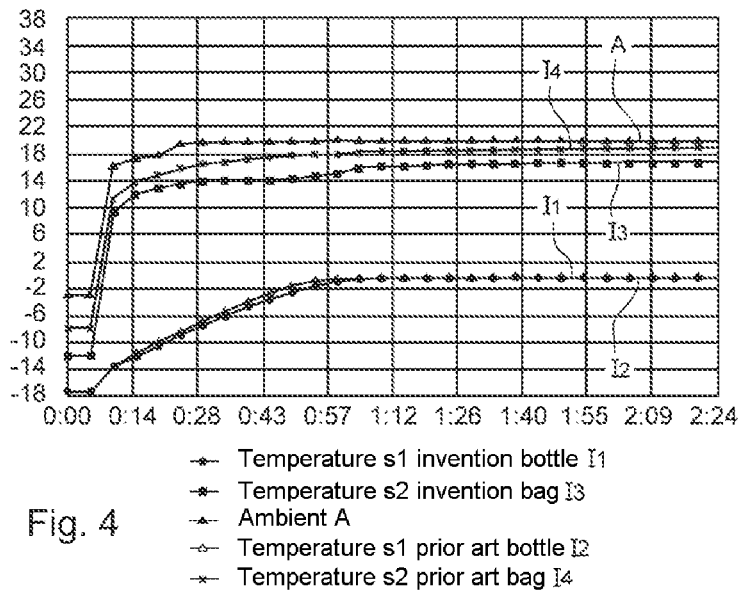
Figure 5:
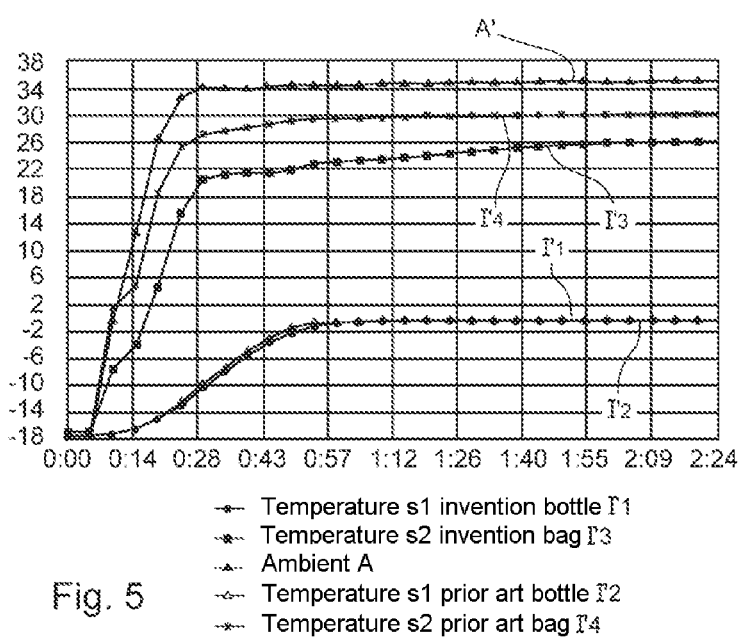

Other characteristics and advantages of the invention shall appear more clearly when reading the following description of embodiments of the invention, given by way of non-restrictive examples for the purposes of illustration and of the annexed drawing wherein:

FIG. 1 shows a first example of a container in accordance with the invention, diagrammatically, in perspective, FIG. 2 is a diagrammatical and partial transversal cross-section view of the walls of the container of FIG. 1, FIG. 3 is a diagrammatical and partial transversal cross-section view of the walls of a second example of a container in accordance with the invention, FIG. 4 is a diagrammatical graph of the temperature according to time, plotted during a test concerning the container of the first example at an ambient temperature of 20° C. and the container of prior art, FIG. 5 is a graph similar to that of FIG. 4, at an ambient temperature of 35° C., and FIG. 6 shows another example of a container in accordance with the invention, diagrammatically, in perspective.

DETAILED DESCRIPTION OF EMBODIMENTS OF THE INVENTION

FIG. 1 shows an example of a container 1 in accordance with the invention, having an insulating power. The container 1 consists, in this example, of a bag of substantially parallelepiped shape comprising a pouch 2 and a cover 3 and comprising a plurality of walls 7. The bag can be closed using a zip closure 4 extending over three of the four sides of the cover 3 in such a way as to improve the insulation of the interior of the bag. The container 1 further comprises two handles 5 sewn by their lower ends 6 to the pouch 2.

The container 1 can contain one or several food products or others, in particular refrigerated, frozen or deep frozen, for a total mass between 0 and 10 kg for example.

FIG. 2 shows the composition of the walls 7 of the pouch 2 and of the cover 3.

In the example shown, these walls 7 are comprised of three layers superimposed on one another, here a central layer 10 of a first material, an exterior layer 11 of a second material, and an interior layer 12 of a third material. The exterior layer 11 is that which can be seen from the exterior of the bag while the interior layer 12 is the layer that can be seen inside the bag. Finally, the central layer 10 cannot be seen, in the example shown.

All of the layers constituting the walls 7 of the container 1 include natural fibres. The central layer 10 includes jute, for example jute canvas. The exterior layer 11 and interior layer 12 can include the same material or different materials. The second and third materials can be selected for example from cotton, silk, flax, or any other natural fibre, such as hemp, wool.

In the example shown, the exterior layer 11 is made of cotton, as well as the interior layer 12. The densities of the exterior layer 11 and interior layer 12 are, in this example, different, as the exterior layer 11 is denser than the interior layer 12.

The interior layer 12, which can be referred to as a lining, has a density of approximately 110 g/m2. The exterior layer 11 has a density of approximately 240 g/m2. Finally, the central layer 10 has a density of approximately 250 g/m2.

In the example shown, the handles 5 are made of the same material as the exterior layer 11, but this can be otherwise without leaving the scope of the invention.

The layers of the walls 7 are, in the example shown, not glued but only sewn together at the seams of the container 1.

In an alternative not shown, interior and exterior layers can be of the same density and/or of different materials.

In another alternative not shown, at least one of the layers can be coated for example with a waterproofing product, a paint or other. A layer of polymer, for example of polyethylene, can for example be glued onto one of the layers, in particular onto the exterior layer 11, to the exterior of the latter, forming a coating of the container 1, providing it with rigidity and waterproofing.

In the example shown in FIGS. 1 and 2, the central layer 10 is comprised of a single layer, but it can be formed of several layers without leaving the scope of the invention. FIG. 3 thus shows the walls of a second example of a container 1 similar to that of FIGS. 1 and 2, but comprising a central layer 10a and a central layer 10b, with each of the layers 10a and 10b having, in this example, a density equal to approximately 125 g/m2.

FIG. 6 shows another type of container 1 in accordance with the invention with a substantially cylindrical shape, consisting in this example of a bottle holder having insulating properties with walls 7 of a pouch 2 and of a cover 3, as shown in the example in FIGS. 1 and 2.

EXAMPLES

In order to measure the isothermal properties of the container 1 in accordance with the invention, the following tests were carried out, of which the results are shown on the graphs of FIGS. 4 and 5 commented on hereinafter. The objective of the tests carried out is to comparatively evaluate the thermal efficiency of a container in accordance with the invention and of a bag from prior art.

First Test:

The container, or bag, from prior art has the following characteristics

Exterior material 100% polyester 300 D, "tarp" lining.

The container 1 tested in comparison is in accordance with the first example described hereinabove with regards to FIGS. 1 and 2 and comprises three layers, an exterior cotton layer, density 240 g/m2, a single central layer of jute of density 250 g/m2 and an interior cotton layer, density 110 g/m2.

Two bottles of water will be used as control deep frozen products. A hole 4 mm in diameter is arranged in the centre of the cap of each bottle.

Each bottle is provided with a temperature sensor allowing its heating to be monitored all throughout the test. These sensors are placed in a central position at 5 cm from the bottom of the bottle.

Another sensor is attached to the periphery of each bottle according to the lengthwise direction at a distance of 5 cm from the bottom. Two other sensors are left free in a climatic enclosure, wherein the bottles are placed.

The connection wires of the temperature sensors pass through the openings that are specially arranged on either side of the climatic enclosure.

The bottles are filled with a precise quantity of 900 ml of distilled water and they are positioned vertically at the centre of the climatic enclosure on a suitable plate, each in a container, one in the container in accordance with the invention, the other in the container of prior art. The correct positioning of the sensors at the centre of the bottles is verified.

After hermetic closure of the enclosure, the enclosure is refrigerated to a temperature of −18° C. with 0% relative humidity for a period of at least 24 hours in such a way as to ensure full solidification of the water.

The station for measuring temperatures is turned on. The enclosure is then brought to an ambient temperature of 20°

C. in this first test, with 65% relative humidity. A measurement is taken with the five sensors available approximately every five minutes.

The temperatures are read for a period of 2 h 24 min in this test using the change in regulation settings, i.e. the change in temperature and humidity.

At the end of the test, the change in the various temperatures according to time is represented and the graph in FIG. 4 is obtained.

On this graph which shows the temperature (expressed in ° C.) as a function of time (expressed in h) of FIG. 4, several recorded curves can be seen. Note first of all a curve A for the ambient temperature. Then note a curve 11 for the temperature inside the bottle installed in the container 1 in accordance with the invention, a curve 12 for the temperature inside the bottle contained in a bag from prior art. Finally, curve 13 shows the temperature inside container 1 in accordance with the invention and a curve 14 for the temperature inside the bag from prior art.

As can be observed when reading this graph, the insulating power of the container 1 in accordance with the invention is substantially equal and even higher than that of the bag from prior art. Indeed, the temperature in the container in accordance with the invention (curve 13) remains lower than that inside the bag from prior art (curve 14), over the entire duration of the test.

Second Test:

A second test was carried out of which the results are shown in FIG. 5 in the form of a graph of the temperature (expressed in ° C.) as a function of time (expressed in h). The protocol for the second test is the same as that of the first test except in that the ambient temperature for the measurement of temperatures is set to 35° C. with 65% relative humidity.

The graph in FIG. 5 comprises the curves A' for the ambient temperature, I1' for the temperature inside the bottle installed in the container 1 in accordance with the invention, I2' for the temperature inside the bottle contained in a bag from prior art, I3' for the temperature inside the container 1 in accordance with the invention and I4' for the temperature inside the bag from prior art.

As well as on the graph shown in FIG. 4, it can be observed on the graph of FIG. 5 that the temperature curves inside the bag are again proof of the insulating power of the container 1 in accordance with the invention which is at least as significant if not, as shown, even more significant than that of the insulated container of prior art. Indeed, it can be observed that the temperature present inside the container 1 in accordance with the invention (curve I3') is substantially less than the temperature present in the bag from prior art (curve I4'), during the entire test.

The invention is of course not restricted to the examples that have just been described.

In particular, the walls 7 of the bag 2 and of the cover 3 can include more than three layers without leaving the scope of the invention. For example, the container can include several layers of jute, at least two as shown in FIG. 3, or more.

The scope of the invention is also not left if the walls 7 of the container 1 are constituted solely of two layers, i.e. one layer of a first material including jute and one layer of a second material, located to the exterior or to the interior of the bag and comprising a natural fibre.

The container 1 can be entirely carried out with the walls 7 or, alternatively, only a portion of the container can be carried out with the various layers constituting the walls 7.

The container does not have to be closed by a closure, for example by a closure of the zip type.

The scope of the invention is not left if the container 1 has a shape that is different from those which are shown, if it does not have any handles or if the latter are of a different manner.

A gluing between the various layers that form the walls can be carried out for example after lamination of each layer or of all of the layers. The gluing can be carried out solely between two layers, for example between the exterior layer and a layer of polymer forming the exterior coating of the container. The gluing can be carried out over a portion of the surface of the layers, or over the totality of this surface.

Throughout the description, the expressions "comprising one" or "including one" must be understood as being synonymous respectively with the expressions "comprising at least one" and "including at least one", unless specified otherwise.

The ranges of values indicated are understood as including the limits, unless specified otherwise.

The invention claimed is:

1. An insulated container, comprising:
    at least one wall comprising:
        at least two layers of a first material including a woven cloth of jute, each of the two layers of the first material has a fabric basis weight substantially equal to 125 g/m$^2$,
        at least one layer of a second material including a woven cloth of cotton with a fabric basis weight that is substantially equal to 110 g/m$^2$, and
        at least one layer of a third material including a woven cloth of cotton with a fabric basis weight that is substantially equal to 240 g/m$^2$ ,
        wherein the two layers of the first material is disposed between the at least one layer of the second material and the at least one layer of the third material.

2. The insulated container according to claim 1, wherein the second material and/or the third material further include a natural fibre selected from the group consisting of: silk, flax, hemp and wool.

3. The insulated container according to claim 1, wherein at least one of the layers is coated with a layer of a polymer.

4. The insulated container according to claim 3, wherein said at least one layer coated with a layer of a polymer is an exterior layer of the container.

5. The insulated container according to claim 3, wherein the polymer includes polyethylene.

6. The insulated container according to claim 1, wherein the container is selected from the group consisting of: an insulated bag, and a bottle holder.

* * * * *